United States Patent [19]
Zäh et al.

[11] Patent Number: 5,852,159
[45] Date of Patent: Dec. 22, 1998

[54] PLASTIC WITH REDUCED SULFUR UPTAKE RATE

[75] Inventors: Matthias Zäh, Gersthofen; Gerhard Pfahler, Augsburg; Karl Gaa, Burtenbach, all of Germany; Klaus Keck-Antoine, Charlotte, N.C.

[73] Assignee: Hoechst Aktiengesellschaft, Frankfurt, Germany

[21] Appl. No.: 646,679

[22] Filed: May 10, 1996

[30] Foreign Application Priority Data

May 10, 1995 [DE] Germany .................. 195 16 701.5

[51] Int. Cl.⁶ .................................................. C08G 63/44
[52] U.S. Cl. ........................... 528/363; 528/364; 544/35; 544/38; 544/48; 549/200; 549/201; 252/47.5; 252/78.1
[58] Field of Search ..................... 528/363, 364; 544/35, 38, 48; 549/200, 201; 252/47.5, 78.1

[56] References Cited

U.S. PATENT DOCUMENTS

| | | |
|---|---|---|
| 4,232,131 | 11/1980 | Rody et al. . |
| 4,468,488 | 8/1984 | Minagawa et al. . |
| 4,863,981 | 9/1989 | Gugumus . |
| 5,112,890 | 5/1992 | Behrens et al. . |
| 5,169,925 | 12/1992 | Schmailzl et al. . |
| 5,246,991 | 9/1993 | Igarashi et al. . |
| 5,428,177 | 6/1995 | Nesvadba ............................ 549/304 |
| 5,503,759 | 4/1996 | Evans et al. ......................... 252/47.5 |

FOREIGN PATENT DOCUMENTS

| | | |
|---|---|---|
| 0 345 220 | 12/1989 | European Pat. Off. . |
| 0 357 223 | 3/1990 | European Pat. Off. . |
| 0 389 431 | 9/1990 | European Pat. Off. . |
| 0 429 731 | 6/1991 | European Pat. Off. . |
| 0 505 203 | 9/1992 | European Pat. Off. . |

*Primary Examiner*—Duc Truong
*Attorney, Agent, or Firm*—Connolly and Hutz

[57] ABSTRACT

The present invention relates to plastics comprising a high molecular weight, sterically hindered amine, wherein the sterically hindered amine is at least one amine from the group consisting of I: oligomerized 2,2,4,4-tetramethyl-20(oxiranylmethyl)-7-oxa-3,20-diazadispiro[5.1.11.2]heneicosan-21-one, II: condensation product of 2-chloro-4,6-di(4-n-butylamino-1,2,2,6,6-pentamethylpiperidyl)-1,3,5-triazine and 1,2-bis(3-aminopropylamino)ethane, and III: condensation product of 1-hydroxyethyl-2,2,6,6-tetramethyl-4-hydroxypiperidine and succinic acid.

These plastics exhibit a reduced rate of uptake of sulfur compounds.

The invention further relates to shaped articles made from these plastics.

14 Claims, No Drawings

PLASTIC WITH REDUCED SULFUR UPTAKE RATE

DESCRIPTION

The outdoor use of plastics, for example in agriculture or horticulture, has been increasing continuously for years. The plastics involved are, for example, films for greenhouses, films for silage, films or nonwovens which are laid out in order to bring forward harvesting, and many others. Materials which can be employed for such articles are all polymers which meet the appropriate requirements. Particularly suitable for these applications are polyolefins. Polyvinyl chloride (PVC) is especially suitable for films, but is being increasingly displaced by homopolymers of polyethylene (PE) and its copolymers with, for example, EVA. PE films and PP fibers, processed to give nonwovens, are often used in agriculture as a covering material for crops in order to bring forward harvesting.

For outdoor use, polyolefins based on PE or PP homo- or copolymer must be stabilized by the use of additives, which for a long time were nickel quenchers and UV absorbers. Since the beginning of the 1980s, nickel quenchers have been replaced to an ever-increasing extent by high molecular weight, sterically hindered amines (HALS), since agricultural or greenhouse films treated with HALS possess greater stability to light and heat. The stabilization of plastics with sterically hindered amines is described in EP 28 318 and EP 402 889. The state of the art is regarded as being the stabilization of plastics with the sterically hindered amine of the formula IV (F. Henninger, E. Pedrazetti, Plasticulture, 80, 1988/84, 5–23).

The lifetime of a film (Handbook of Polymer Degradation, 1st edition, Marcel Dekker Inc., New York, 1992, Chapter 14: Aspects of Greenhouse Film Stabilization) depends partly on the film itself (material, stabilization, thickness, pigment, fillers) and partly on external influences, such as greenhouse construction, climatic conditions, and contact with chemicals, especially agricultural chemicals (F. J. Barahona, J. M. G. Vasquez, Plasticulture 65, 1985, 3–10). Chemicals can make a significant contribution to the accelerated degradation of such films, with these chemicals usually being sulfuror halogen-containing compounds. An especially adverse effect is caused by sulfur-containing compounds, for example sodium N-methyldithiocarbamate. In this context there is a direct connection between the quantity of sulfur found in the film and the residual film quality: the higher the content of sulfur, the poorer the residual quality of the film. Films which have been destroyed are found to have an extremely high sulfur content.

Other sources of sulfur which exert an effect on the sulfur content of the plastic are hydrogen sulfide, for example from agrochemicals or gases from decaying material, or sulfur dioxide, which is formed when elemental sulfur is burnt or may come from the air (acid rain). Sulfur dioxide affects not only plastics specifically in the agricultural sector but also, quite generally, articles made of plastic (films, plates, extruded articles, fibers) and articles produced therefrom, such as tapes, nonwovens and fabrics.

The aim of the invention, then, was to find a possibility of reducing the sensitivity of plastics to sulfur-containing factors (for example agrochemicals, hydrogen sulfide, sulfur dioxide). It has now surprisingly been found that a plastic which comprises specific HALS exhibits a reduced rate of uptake of sulfur-containing compounds.

The invention therefore provides a plastic comprising a high molecular weight, sterically hindered amine, wherein the sterically hindered amine is at least one amine from the group consisting of I: oligomerized 2,2,4,4-tetramethyl-20-(oxiranylmethyl)-7-oxa-3,20-diazadispiro[5.1.11.2]heneicosan-21-one, II: condensation product of 2-chloro-4,6-di(4-n-butylamino-1,2,2,6,6-pentamethylpiperidyl)-1,3,5-triazine and 1,2-bis(3-aminopropylamino)ethane, and III: condensation product of 1-hydroxyethyl-2,2,6,6-tetramethyl-4-hydroxypiperidine and succinic acid.

A particularly suitable plastic is one which comprises at least one sterically hindered amine of the formula I, of the formula II or of the formula III and at least one amine selected from the group consisting of IV: condensation product of N,N'-bis(2,2,6,6-tetramethyl-4-piperidyl)hexamethylenediamine and 4-tert-octylamino2,6-dichloro-1,3,5-triazine, V: condensation product of N,N'-bis(2,2,6,6-tetramethyl-4-piperidyl)hexamethylenediamine and 4-morpholino-2,6-dichloro-1,3,5-triazine, and VI: condensation product of 2,4-dichloro-6-(4-n-butylamino-2,2,6,6-tetramethylpiperidyl)-1,3,5-triazine and 1,2-bis{3-[4',6'-di(4"-n-butylamino-2",2", 6",6"-tetramethylpiperidyl)-1',3',5'-triazinyl]aminopropylamino}ethane.

The invention additionally provides shaped articles, for example films, plates, extruded articles and fibers, and products produced therefrom, such as tapes, fabrics or nonwovens, which are prepared from the plastics according to the invention, especially polyolefins (homo- and copolymers), in particular HDPE, preferably LDPE (homo- and copolymers) or PP, especially preferably LDPE (homopolymers and copolymers with EVA), LLDPE or PP.

The compounds I, II and III and any desired mixtures, with or without compound IV, V and/or VI, are employed in concentrations of from 0.001 to 5% by weight, preferably from 0.02 to 1% by weight, based on the organic material, and are added before, during or after its preparation.

Plastics which can be stabilized in the manner according to the invention include the following materials:

1. Polymers of mono- and diolefins, for example high-, medium- or low-density polyethylene (which may, if desired, be crosslinked), polypropylene, polyisobutylene, poly-1-butene, polymethyl-1-pentene, polyisoprene or polybutadiene, and polymers of cycloolefins, for example cyclopentene or norbornene.

2. Mixtures of the polymers mentioned under 1., for example mixtures of polypropylene with polyethylene or with polyisobutylene.

3. Copolymers of mono- and diolefins with one another or with other vinylmonomers, for example ethylene-propylene copolymers, propylene-1-butene copolymers, propylene-isobutylene copolymers, ethylene-1-butene copolymers, ethylene-1-hexene copolymers, ethylene-octene copolymers, propylene-butadiene copolymers, ethylenealkyl methacrylate copolymers, ethylene-vinyl acetate copolymers or ethylene-acrylic acid copolymers, and also terpolymers of ethylene with propylene and a diene, such as hexadiene, dicyclopentadiene or ethylidenenorbornene.

The organic material stabilized by the compounds according to the invention can if desired also contain further additives, examples being processing stabilizers, antioxidants, light stabilizers, acid scavengers, metal deactivators, antidew agents, nucleating agents, antistatic agents, flame inhibitors, pigments and fillers.

Examples of antioxidants and light stabilizers which can be added in addition to the compounds according to the invention are compounds based on sterically hindered amines or sterically hindered phenols or derivatives of 2-hydroxybenzophenone or of 2-(2'-hydroxyphenyl) benzotriazole, or costabilizers comprising sulfur or nitrogen or phosphorus.

Examples of suitable such compounds are:

1. Antioxidants 1.1 Alkylated monophebols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-iso-butylphenol, 2,6-dicyclopentyl-4-methylphenol, 2-(β-methylcyclohexyl)4,6-dimethylphenol, 2,6-di-octadecyl-4-methylphenol, 2,4,6-tricyclohexylphenol, 2,6-di-tert-butyl-4-methoxymethylphenol, 2,6-di-nonyl-4-methylphenol, 2,4-dimethyl-6-(1'-methylundec-1'-yl)-phenol, 2,4-dimethyl-6-(1'-methylheptadec-1'-yl)-phenol, 2,4-dimethyl-6-(1'-methyltridec-1'-yl)-phenol and mixtures thereof.

1.2 Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol.

1.3 Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenol stearate and bis-(3, 5-di-tert-butyl-4-hydroxyphenyl)adipate.

1.4 Hydroxylated thiodiphenyl ethers, for example 2,2'thiobis(6-tert-butyl-4-methylphenol), 2,2'-thiobis(4-octylphenol), 4,4'-thiobis(6-tert-butyl-3-methylphenol),4,4'-thiobis(6-tert-butyl-2-methylphenol),4,4'-thio-bis(3,6-di-sec.-amylphenol) and 4,4'-bis(2,6-dimethyl-4-hydroxyphenyl) disulfide.

1.5 Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(p-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(β-methylbenzyl)-4-nonylphenol], 2,2'-methylenebis[6-(β,β-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]-terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane and 1,1,5,5-tetra(5-tert-butyl-4-hydroxy-2-methylphenyl)pentane.

1.6 O-, N- and S-benzyl compounds, for example 3,5,3', 5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide and isooctyl 3,5-di-tert-butyl-4-hydroxybenzylmercaptoacetate.

1.7 Hydroxybenzylated malonates, for example dioctadecyl 2,2-bis(3,5-di-tert-butyl-2-hydroxybenzyl) malonate, dioctadecyl 2-(3-tert-butyl-4-hydroxy-5-methylbenzyl)malonate and didodecyl mercaptoethyl-2,2-bis(3,5-di-tert-butyl-4-hydroxybenzyl)malonate.

1.8 Aromatic hydroxybenzyl compounds, for example 1,3,5-tris(3,5-di-tert-butyl-4-hydroxybenzyl)2,4,6-trimethylbenzene, 1,4-bis(3,5-di-tert-butyl-4-hydroxybenzyl)-2,3,4,5,6-tetramethylbenzene and 2,4,6-tris(3,5-di-tert-butyl-4-hydroxybenzyl)phenol.

1.9 Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3, 5-triazine, 1,3,5-tris(3,5-dicyclohexyl-4-hydroxybenzyl) isocyanurate.

1.10 Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate and the calcium salt of monoethyl 3,5-di-tert-butyl-4-hydroxybenzylphosphonate.

1.11 Acylaminophenols, for example 4-hydroxylauranilide, 4-hydroxystearanilide and octyl N-(3,5-di-tert-butyl-4-hydroxyphenyl)carbamate.

1.12 Esters of β-(3,5-di-tert-butyl-4-hydroxyphenol) propionic acid with mono- or polyhydric alcohols, for example with methanol, ethanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxy)ethyl isocyanurate, N,N'-bis (hydroxyethyl)oxalamide, 3-thiaundecanol, 3-thiapentadecanol, trimethylhexanediol, trimethylolpropane and 4-hydroxymethyl-1phospha-2,6,7-trioxabicyclo[2.2.2]octane.

1.13 Esters of β-(5-tert-butyl-4-hydroxy-3-methylphenyl) propionic acid with mono- or polyhydric alcohols, for example with methanol, ethanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxy)ethyl isocyanurate, N,N'-bis (hydroxyethyl)oxalamide, 3-thiaundecanol, 3-thiapentadecanol, trimethylhexanediol, trimethylolpropane and 4-hydroxymethyl-1-phospha-2,6,7-trioxabicyclo[2.2.2]octane.

1.14 Esters of β-(3,5-dicyclohexyl-4-hydroxyphenol) propionic acid with mono- or polyhydric alcohols, for example with methanol, ethanol, octadecanol, 1,6- hexanediol, 1,9-nonanediol, ethylene glycol, 1,2-propanediol, neopentylglycol, thiodiethylene glycol, diethylene glycol, triethylene glycol, pentaerythritol, tris(hydroxy)ethyl isocyanurate, N,N'-bis(hydroxyethyl)oxalamide, 3-thiaundecanol, 3-thiapentadecanol, trimethylhexanediol, trimethylolpropane and 4-hydroxymethyl-1-phospha-2,6,7-trioxabicyclo[2.2.2]octane.

1.15 Esters of 3,5-di-tert-butyl-4-hydroxyphenylacetic acid with mono- or polyhydric alcohols, for example with methanol, ethanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxy)ethyl isocyanurate, N,N'-bis(hydroxyethyl)oxalamide, 3-thiaundecanol, 3-thiapentadecanol, trimethylhexanediol, trimethylolpropane and 4-hydroxymethyl-1-phospha-2,6,7-trioxabicyclo[2.2.2]octane.

1.16 Esters of 3,3-bis(3'-tert-butyl-4-hydroxyphenyl) butyric acid with mono- or polyhydric alcohols, for example with methanol, ethanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxy)ethyl isocyanurate, N,N'-bis(hydroxyethyl)oxalamide, 3-thiaundecanol, 3-thiapentadecanol, trimethylhexanediol, trimethylolpropane and 4-hydroxymethyl-1phospha-2,6,7-trioxabicyclo[2.2.2]octane.

1.17 Amides of β-(3,5-di-tert-butyl-4-hydroxyphenyl) propionic acid, for example N,N'-bis-(3,5-di-tert-butyl-4-hydroxyphenylpropionyl)hexamethylenediamine, N,N'-bis(3,5-di-tert-butyl-4-hydroxyphenylpropionyl) trimethylenediamine and N,N'-bis(3,5-di-tert-butyl-4-hydroxyphenylpropionyl)hydrazine.

1.18 Hydroxylamines, for example dialkylhydroxylamines, such as N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecy-N-octadecylhydroxylamine and N,N-dialkylhydroxylamine derived from hydrogenated tallow amine.

2. UV absorbers and light stabilizers 2.1 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-[2'-hydroxy-5'-(1,1,3,3-tetramethylbutyl)phenyl] benzotriazole, 2-(3'-5'-di-tert-butyl-2'-hydroxyhenyl)-5-chlorobenzotriazole, 2-(3'-tert-butyl-2'-hydroxy-5'-methylphenyl)5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis (β,β-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-(2-octyloxycarbonylethyl) phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl)benzotriazole, and 2-(3'-tert-butyl-2'-hydroxy-5'-(2-isooctylocycarbonylethyl) phenylbenzotriazole, 2,2'methylenebis [4-(1,1,3,3-tetramethylbutyl)-6-benzotriazol-2-ylphenol]; transesterification product of 2-[3'-tert-butyl-5'(2-methoxycarbonylethyl)-2'-hydroxyphenyl] benzotriazole with polyethylene glycol 300; [R—CH$_2$CH$_2$COO(CH$_2$)$_3$]$_2$ where R=3'-tert-butyl-4'-hydroxy-5'-2H-benzotriazol-2-ylphenyl; [R—CH$_2$CH$_2$—COO(CH$_2$CH$_2$O)$_{N/2}$]$_2$ where n=1 to 5 and R=3'-tert-butyl-4'-hydroxy-5'-2H-benzotriazol-2-ylphenyl.

2.2 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivative.

2.3 Esters of substituted or unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate and 2-methyl-4,6-di-tert-butylphenyl 3,5-di-tert-butyl-4-hydroxybenzoate.

2.4 Acrylates, for example ethyl or isooctyl β-cyano-β, β-diphenylacrylate, methyl β-carbomethoxycinnamate, methyl or butyl β-cyano-β-methyl-p-methoxycinnamate, methyl β-carbomethoxy-p-methoxycinnamate and N-(β-carbomethoxy-(β-cyanovinyl)-2-methylindoline.

2.5 Nickel compounds, for example nickel complexes of 2,2'-thiobis[4-(1,1,3,3-tetramethylbutyl)phenol], such as the 1:1 or the 1:2 complex, with or without additional ligands such as n-butylamine, triethanolamine or N-cyclohexyldiethanolamine, nickel dibutyldichiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenyl undecyl ketoxime and nickel complexes of 1-phenyl-4-lauroyl-5-hydroxypyrazole, with or without additional ligands.

2.6 Sterically hindered amines, for example bis(2,2,6,6-tetramethylpiperidyl) sebacate, bis(2,2,6,6-tetramethylpiperidyl) glutarate, bis(2,2,6,6-tetramethylpiperidyl) succinate, bis(1,2,2,6,6-pentamethylpiperidyl) sebacate, bis(1,2,2,6,6-pentamethylpiperidyl) glutarate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, 2,2,6,6-tetramethylpiperidyl behenate, 1,2,2,6,6-pentamethylpiperidyl behenate, tris (2,2,6,6-tetramethyl-4-piperidyl) nitrilotriacetate, tetrakis(2,2,6,6-tetramethyl-4-piperidyl) 1,2,3,4-butanetetraoate, tetrakis(1,2,2,6,6-pentamethyl-4-piperidyl) 1,2,3,4-butanetetraoate, 1,1'-(1,2-ethanediyl) bis(-3,3,5,5-tetramethylpiperazinone), 4-benzoyl-2,2,6,6-tetramethylpiperidine, 4-stearyloxy-2,2,6,6-tetramethylpiperidine, 4-stearoyloxy-2,2,6,6-tetramethylpiperidine, 4,-stearyloxy-1,2,2,6,6- pentamethylpiperidine, 4-stearoyloxy-1,2,2,6,6-pentamethylpiperidine, bis(1,2,2,6,6-pentamethylpiperidyl) 2-n-butyl-2-(2-hydroxy-3,5-di-tert-butylbenzyl)malonate, bis(1,2,2,6,6-pentamethylpiperidyl) 2-n-butyl-2-(4-hydroxy-3,5-di-tert-butylbenzyl)malonate, 3-n-octyl-7,7,9,9-tetramethyl-1,3,8-triazaspiro[4,5]decane-2,4-dione, bis (1-octyloxy-2,2,6,6-tetramethylpiperidyl)sebacate, bis (1-octyloxy-2,2,6,6-tetramethylpiperidyl) succinate, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-methoxypropylamino-2,2,6,6-tetramethylpiperidyl)-1,3,5-triazine and 1,2-bis(3-aminopropylamino)ethane, condensation product of 2-chloro-4,6-di-(4-methoxypropylamino-1,2,2,6,6-pentamethylpiperidyl)-1,3,5-triazine and 1,2-bis(3-aminopropylamino)ethane, condensation products of 2-chloro-4,6-di(4-n-butylamino-1,2,2,6,6-pentamethylpiperidyl)-1,3,5-triazine and 1,2-bis(3-aminopropylamino)ethane, reaction products of 2-chloro-4,6-d-i(4-n-butylamino-2,2,6,6-tetramethylpiperidyl)-1,3,5-triazine with monovalent or polyvalent amines, between one and all of the active hydrogen atoms on the amine being replaced, such as with ethylenediamine, diethylenetriamine, triethylentetramine, hexamethylenediamine, and 1,2-bis(3-aminopropylamino)ethane, reaction products of 2-chloro-4,6-di(4-n-butylamino-1,2,2,6,6-pentamethylpiperidyl)-1,3,5-triazine with monovalent or polyvalent amines, between one and all of the active hydrogen atoms on the amine being replaced, such as with ethylenediamine, diethylaminetriamine, triethylenetetramine, hexamethylenediamine and 1,2-bis(3-aminopropylamino)ethane, reaction products of 2-chloro-4,6-di(4-n-butylamio-2,2,6,6-tetramethylpiperidyl)-1,3,5-triazine and 4-tert-octylamino-2,6-dichloro-1,3,5-s-triazine with monovalent or polyvalent amines, between one and all of the active hydrogen atoms on the amine being replaced, such as with ethylenediamine, diethylenetriamine, triethylenetetramine, hexamethylenediamine and 1,2-bis(3-aminopropylamino)ethane, reaction products of 2-chloro-4,6-di-(4-n-butylamino-1,2,2,6,6-pentamethylpiperidyl)-1,3,5-triazine and 4-tert-octylamino-2,6-dichloro-1,3,5-s-triazine with monovalent or polyvalent amines, between one and all of the active hydrogen atoms on the amine being replaced, such as with ethylenediamine, diethylenetriamine, triethylenetetramine, hexamethylenediamine and 1,2-bis(3-aminopropylamino)ethane, reaction products of 2-chloro-4,6-di-(4-n-butylamino-2,2,6,6-tetramethylpiperidyl)-1,3,5-triazine and 4-(4-n-butylamino-2,2,6,6-tetramethylpiperidyl)-2,6-dichloro-1,3,5-s-triazine with monovalent or polyvalent amines, between one and all of the active hydrogen atoms on the amine being replaced, such as with ethylenediamine, diethylenetriamine, triethylenetetramine, hexamethylenediamine and 1, 2-bis-(3-aminopropylamino) ethane, reaction products of 2-chloro-4,6-di-(4-n-butylamino-1,2,2,6,6-pentamethylpiperidyl)-1,3,5-triazine and 4-(4-n-butylamino-2,2,6,6-tetramethylpiperidyl)-2,6-dichloro-1,3,5-s-triazine with monovalent or polyvalent amines, between one and all of the active hydrogen atoms on the amine being replaced, such as with ethylenediamine, diethylenetriamine, triethylenetetramine, hexamethylenediamine and 1,2-bis-(3-aminopropylamino) ethane, 3-dodecyl-7,7,9,9-tetramethyl-1,3,8-triazaspiro [4,51 decane-2,4-dione, oligomerized 2,2,4,4-tetramethyl20(oxiranylmethyl)-7-oxa-3,20-diazadispiro[5.1.11.2]-heneicosan-21-one, oligomerized 1,2,2,4,4-pentamethyl-20-(oxiranylmethyl)-7-oxa-3,20-diazadispiro [5.1.11.2] heneicosan-21-one, oligomerized 1-acetyl-2,2,4,4-tetramethyl-20-(oxiranylmethyl) -7-oxa-3,20-diazadispiro[5.1.11.2]heneicosan-21-one, dodecyl-1(2, 2,4,4-tetramethyl-4-piperidyl)pyrrolidine-2,5-dione, 3-dodecyl-1-(1,2,2,6,6-pentamethyl-4-piperidyl) pyrrolidine-2,5-dione, 2,2,4,4-tetramethyl-7-oxa-3,20-diazadispiro[5.1.11.2]heneicosan-21-one, dodecyl2,2, 4,4-tetramethyl-7-oxa-21-oxo-3,20-diazadispiro-[5.1.11.2]heneic osane-3-propanoate, tetradecyl2,2,4, 4-tetramethyl-7-oxa21-oxo-3,20-diazadispiro-[5.1.11.2]heneicosan-3-propano ate, 2,2,3,4,4-pentamethyl-7-oxa-3,20-diazadispiro[5.1.11.2] heneicosan-21-one, dodecyl 2,2,3,4,4-pentamethyl-7-oxa-21-oxo-3,20-diazadispiro-[5.1.11.2]heneicosane-3-propanoate, tetradecyl 2,2,3,4,4-pentamethyl7-oxa-21-oxo-3,20-diazadispiro[5.1.11.2]heneicosane-3-propanoate, 3-acetyl-2,2,4,4-tetramethyl-7-oxa-3,20-diazadispiro-[5.1.11.2]henicosan-21-one, dodecyl 3-acetyl2,2,4,4-tetramethyl-7-oxa-21-oxo-3,20-diazadispiro[5.1.11.2]heneicosane-3-propanoate, tetradecyl 3-acetyl-2,2,4,4-tetramethyl-7-oxa-21-oxo-3, 20-diazadispiro[5.1.11.2]heneicosane-3-propanoate,1, 1',3,3',5,5'-hexahydro-2,2',4,4',6,6'-hexaaza-2,2',6,6'-bismethano-7,8-dioxo-4,4'-bis-(1,2,2,6,6-pentamethyl-4-piperidyl)biphenyl, poly-N,N'-bis-(2,2,6,6-tetramethyl-4-piperidyl)-1,8-diazadecylene, addition compound of 2,2,6,6-tetramethyl-4-allyloxypiperidine with polymethylhydrydosiloxane (molecular mass up to 4000), addition compound of 1,2,2,6,6-pentamethyl-4-allyloxypiperidine and polymethylhydridosiloxane (molecular mass up to 4000), N,N'-diformyl-N,N'-bis (2,2,6,6-tetramethyl-4-piperidinyl) hexamethylenediamine, N,N'-diformyl-N,N'-bis(1,2,2, 6,6-pentamethyl-4-piperidinyl)hexamethylenediamine, 5,11-bis(2,2,6,6-tetramethyl-4-piperidinyl)3,5,7,9,11, 13-hexaazatetracyclo[7.4.0.0$^{2,7}$0.1$^{3,13}$]-tetradecane-8, 14-dione, 5,11-bis(1,2,2,6,6-pentamethyl-4-piperidinyl) -3,5,7,9,11,13-hexaazatetracyclo[7.4.0.0$^{2,7}$0.1$^{3,13}$]-tetradecane-8,14-dione, 7,7,9,9-tetramethyl-8-acetyl-3-dodecyl-1,3,8-triazaspiro[4.5]decane-2,4-dione, bis(2,2,6,6-tetramethyl-4-piperidyl) [(4-methoxyphenyl)methylene]propanedioate, bis(1,2,2,6, 6-pentamethyl-4-piperidyl) [(4-methoxyphenyl) methylene]propanedioate, 2,4,6-tris(N-cyclohexyl-N-[2-(3,3,4,5,5-pentamethylpiperazinon-1-yl) ethyl] amino)-1,3,5-triazine, copolymer of styrene with β-methylstyrene and maleic anhydride reacted with 4-amino-1,2,2,6,6-pentamethylpiperidine and octadecylamine, polycarbonate with 2,2'-bis[(2,2,6,6-tetramethyl-4-piperidyl)imino] ethanol as diol component, polycarbonate of 2,2'-bis[(1,2,2,6, 6pentamethyl-4-piperidyl)imino ethanol as diol component, copolymer of maleic anhydride and a β-olefin up to C30 reacted with 4-amino-2,2,6,6-tetramethylpiperidine, copolymer of maleic anhydride and a β-olefin up to C30 reacted with 1-acetyl-4-amino-2,2,6,6-tetramethylpiperidine, copolymer of maleic anhydride and a β-olefin up to C30 reacted with 4-amino-1,2,2,6,6-pentamethylpiperidine, 20,20'-(2-hydroxy-1,3-propanediyl)bis [2,2,4,4-tetramethyl-7- oxa-3,20-diazadispiro[5.1.11.2]heneicosan-21-one], 20,20'-(2-acetyloxy-1,3-propanediyl)bis [3-acetyl-2,2,4,4-tetramethyl-7-oxa-3,20diazadispiro[5.1.11.2] heneicosan-21-one], 20,20'-(2methyloxy-1,3-propanediyl)bis [2,2,4,4-tetramethyl-7-oxa-3,20-diazadispiro[5.1.11.2]heneicosan-21-one], 20,20'-(2-hydroxy-1,3-propanediyl)bis[1,2,2,4,4-pentamethyl-7-oxa3,20-diazadispiro[5.1.11.2]heneicosan-21-one], 20,20'-(2methyloxy-1,3-propanediyl) -bis[1,2,2,4,4-pentamethyl-7oxa-3,20-diazadispiro-[5.1.11.2] heneicosan-21-onel, 20,20'-(2-trimethylsilyloxy-1,3-propanediyl)bis[2,2,4,4tetramethyl-7--oxa-3,20-diazadispiro[5.1.11.2]heneicosan 21-one], 20,20'-(2-phenylaminocarbonyloxy-1,3propanediyl)bis[2,2,4,4-tetramethyl-7-oxa-3,20-di azadispiro [5.1.11.2] heneicosan-21-one] and the N-alkyloxy and N-aryloxy derivatives of the abovementioned compounds with free NH groups on the piperidine, specifically methylbenzyloxy and alkyloxy from C1 to C18.

2.7 Oxalamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis-(3-dimethylaminopropyl) oxalamide, 2-ethoxy-5-tert-butyl-2'-ethyloxanilide and its mixture with 2-ethoxy-2'-ethyl-5,4'-di-tert-butyloxanilide, and mixtures of o- and p-methoxy- and of o- and p-ethoxydisubstituted oxanilides.

2.8 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis-(2,4-dimethylphenyl)-1,3,5-triazine, 2-(2,4-dihydroxyphenyl)-4,6-bis(2,4-dimethylphenyl)-1,3,5-triazine, 2-(2,4-dihydroxyphenyl)-4,6-bis-(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine and 2-[2-hydroxy-4-(2-hydroxy-3-octyloxypropyloxy)phenyl]-4,6-bis(2,4-dimethylphenyl)-1,3,5-triazine.

3. Metal deactivators, for example N,N'-diphenyloxalamide, N-salicylal-N'-salicyloylhydrazine, N,N'-bis (salicyloyl) hydrazine, N,N'-bis(3,5-di-tert-butyl-4-hydroxyphenylpropionyl)hydrazine, 3-salicyloylamino-1,2,4triazole, bis(benzylidene)oxalic acid dihydrazide, oxanilide, isophthalic acid dihydrazide, sebacic acid bisphenylhydrazide, N,N'-diacetyladipic acid dihydrazide, N,N'-bis-salicyloyloxalic acid dihydrazide, N,N'-bissalicyloyl-thiopropionic acid dihydrazide, 2,2'-oxamidobis[ethyl-3-(3,5-di-tert-butyl-4-hydroxyphenyl) pro pionate], and the oligomer of phosphorus trichloride and 4,4'-di(5-tert-butyl-4-hydroxy-2-methylphenyl) thioether.

4. Phosphites and phosphonites, for example triphenyl phosphite, diphenyl alkyl phosphites, phenyl dialkylphosphites, tris(nonylphenyl)phosphite, trilauryl phosphite, trioctadecyl phosphite, distearyl pentaerythritol diphosphite, tris(2,4-di-tert-butylphenyl)phosphite, diisodecylpentaerythritol-diphosphite, bis(2,4-di-tert-butylphenyl) pentaerythritol diphosphite, bis-stearyl pentaerythritol diphosphite, bis(2,6-di-tert-butyl-4-methylphenyl) pentaerythritol diphosphite, bisisodecyloxy pentaerythritol disphosphite, bis(2,4-di-tert-butyl-6methylphenyl) pentaerythritol diphosphite, bis (2,4,6-tri-tert-butylphenyl) pentaerythritol diphosphate, tristearyl sorbitol triphosphite, tetrakis (2,4-di-tert-butylphenyl) 4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g] 1,3,2-dioxaphosphocine, bis (2,4-di-tert-butyl-6-methylphenyl) methyl phosphite, bis (2,4-di-tert-butyl-6-methylphenyl) ethyl phosphite, tris(2-tert-butyl-4-thio(2'-methenyl-4'-hydroxy-5'-tert-butyl) phenyl 5-methenyl) phenyl phosphite, 2,2',2"-nitriloethanol tris(3,3',5,5'-tetra-tert-butyl-1,1'-biphenyl-2,2'-diyl) phosphite, 2,2;,2"-nitriloethanol tris-(3,3',5,5'-tetratert-butyl-1,1'-biphenyl-2,2'-diyl) phosphite and bis (2,4-dicumylphenyl)pentaerythritol diphosphate.

5. Peroxide-destroying compounds, for example esters of thiodipropionic acid, for example the lauryl, stearyl, myristyl or tridecyl ester, mercaptobenzimidazole, the zinc salt of 2-mercaptobenzimidazole, zinc alkyldithiocarbamates, zinc dibutyldithiocarbamate, dioctadecyl monosulfide, dioctadecyl disulfide, and pentaerythritol tetrakis(β-dodecylmercapto)propionate.

6. Polyamide stabilizers, for example copper salts in combination with iodides and/or phosphorus compounds and salts of divalent manganese.

7. Basic costabilizers, for example melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example Ca stearate, Zn stearate, Mg behenate, Mg stearate, Na ricinoleate, K palmitate, antimony pyrocatecholate or tin pyrocatecholate, metal oxides, for example magnesium oxide and zinc oxide, and acid scavengers based on an ion exchanger or molecular sieve, for example hydrotalcites or zeolites.

8. Nucleating agents, for example 4-tert-butylbenzoic acid, adipic acid, diphenylacetic acid, sodium benzoate, talc, and mono- or dibenzylidene sorbitols, with or without substituents.

9. Fillers and reinforcing agents, for example calcium carbonate, silicates, glass fibers, asbestos, talc, kaolin, mica, barium sulfate, metal oxides and metal hydroxides, carbon black, graphite, zeolites, IR-active substances and IR reflectors, for example zeolites or silicates.

10. Benzofuranones

11. Antidew agents, such as esters of sorbitol or of glycerol.

12. Antistatic agents, such as ethoxylated amines, alkanesulfonates, fatty acid esters and quaternary ammonium compounds.

13. Pigments, such as titanium dioxide, carbon black, inorganic and organic colour pigments.

14. Other additives, for example plasticizers, lubricants, emulsifiers, fluorescent whiteners, flame-proofing agents, antistatic agents and blowing agents.

The additives are incorporated into the organic polymers by generally customary methods. Incorporation can be effected, for example, by mixing in or applying the compounds, with or without further additives, into or onto the polymer, directly after polymerization or into the melt prior to or during the shaping operation. Incorporation can also be effected by applying the dissolved or dispersed compounds to the polymer, directly, or mixing them into a solution, suspension or emulsion of the polymer, with or without subsequent evaporation of the solvent. The compounds are also effective if they are introduced subsequently, in a separate processing step, into an already granulated polymer.

The compounds to be used in accordance with the invention can also be added in the form of a masterbatch to the polymers to be stabilized, said masterbatch containing these compounds in a concentration of, for example, from 1 to 75% by weight, preferably from 2.5 to 30% by weight.

From the polymers stabilized in accordance with the invention it is possible to produce all articles which are usually made of these polymers. These may, for example, be thin fibers of 1 dtex to thick monofilaments with a diameter of 5 mm, and articles produced therefrom, for example nonwovens for bringing forward harvesting, or blown or extruded films with a thickness of from 0.01 mm to 3 mm, oriented or otherwise, which are employed directly or are processed further into strips, for example, or plates with a thickness of up to 5 mm of material, which can be employed, for example, in greenhouse construction.

EXAMPLES

The examples which follow are intended to illustrate the invention in more detail. As examples of sulfur sources, hydrogen sulfide, sulfur dioxide/sulfurous acid and sodium N-methyldithiocarbamate were employed.

Example 1

Preparation of the films 2000 g of LDPE
3 g of HALS

The sterically hindered amine is dissolved in 300 ml of acetone, the solution is added to the LDPE powder, and the solvent is removed by distillation at 60° C. in a rotary evaporator, under a water pump vacuum at the end. The powder is twice extruded and granulated (temperature program 130° C./150° C./170° C., 125 rpm). The granules are processed in a Göttfert laboratory extruder with a film blowing head (temperature program 160° C./170° C./180° C./200° C./200° C./200° C., 50 rpm) to form a 200μ film.

Example 2

Effect of hydrogen sulfide

The effect of hydrogen sulfide on the lifetime of the films is determined by means of the following test cycle (based on DIN 53 387): 125 hours of exposure in the Xenotest 450 (relative atmospheric humidity 20%, black panel temperature 50° C.) are followed in each case by treatment with hydrogen sulfide for 2 hours. For this treatment, the specimens are stored for 2 hours in the dark in a pure hydrogen sulfide atmosphere. The cycle then begins again. After periods of 250 hours (250 h, 500 h, 750 h, . . . up to 1750 h), the sulfur content of the specimens is determined. Table 1 gives the average sulfur uptake per treatment with hydrogen sulfide.

TABLE 1

Average sulfur uptake per treatment with hydrogen sulfide

| HALS | ppm of sulfur |
| --- | --- |
| ------------ | 14 |
| IV | 20 |
| II | 14 |
| III/IV = 1:1 | 15 |
| III/V = 1:1 | 14 |
| III/VI = 1:1 | 16 |
| I | 16 |

Example 3

Effect of sulfur dioxide/sulfurous acid

The test cycle is as described in Example 2. However, the films were immersed for 2 hours in 0.1N sulfurous acid. After initial drying of the adhering sulfurous acid, they are exposed to light again. Prior to the determination of sulfur, the specimens were washed thoroughly with demineralized water in order to avoid errors caused by adhering sulfur compounds. Table 2 gives the average sulfur uptake per treatment with sulfurous acid.

TABLE 2

Average sulfur uptake per treatment with sulfurous acid

| HALS | ppm of sulfur |
| --- | --- |
| ------------ | 17 |
| IV | 30 |
| I | 24 |

Example 4

Effect of sodium N-methyldithiocarbamate

The test cycle is as described in Example 2. However, the films were immersed for 2 hours in a 3% strength solution of sodium N-methyldithiocarbamate. After initial drying of the adhering solution, they are exposed to light again. Prior to the determination of sulfur, the specimens were washed thoroughly with demineralized water in order to avoid errors caused by adhering sulfur compounds. Table 3 gives the average sulfur uptake per treatment with sodium N-methyldithiocarbamate.

TABLE 3

Average sulfur uptake per treatment with sodium N-methyldithiocarbamate

| HALS | ppm of sulfur |
| --- | --- |
| ------------ | 62 |
| IV | 62 |
| II | 53 |
| III/IV = 1:1 | 54 |
| III/V = 1:1 | 53 |
| III/VI = 1:1 | 55 |
| V | 63 |
| VI | 62 |
| I | 49 |

We claim:

1. An organic, polymeric plastic containing a sulfur uptake inhibiting amount of sterically hindered amine, wherein said sterically hindered amine is at least an oligomerized 2,2,4,4-tetramethyl-20-(oxiranyl-methyl)-7-oxa-3, 20-diazadispiro{5.1.11.2}heneicosan-21-one.

2. A method for inhibiting the sulfur uptake in an organic, polymeric plastic which comprises adding a sulfur-uptake inhibiting amount of sterically hindered amine to said plastic, wherein the sterically hindered amine is at least one of the following amine compounds:

I: oligomerized 2,2,4,4-tetramethyl-20-(oxiranyl-methyl) -7-oxa-3,20-diazadispiro{5.1.11.2}heneicosan-21-one, II: condensation product of 2-chloro-4,6-di(4-n-butylamino-1,2,2,6,6-pentamethylpiperidyl)-1,3,5-triazine and 1,2-bis(3-aminopropylamino)ethane, or III: condensation product of 1-hydroxyethyl-2,2,6,6-tetramethyl-4-hydroxypiperidine and succinic acid.

3. The method as claimed in claim 2, containing at least one amine compound of the formula I, of the formula II or of the formula III and also at least one of the following amine compounds:

IV: condensation product of N,N'-bis(2,2,6,6-tetramethyl-4-piperidyl)hexamethylenediamine and 4-tert-octylamino-2,6-dichloro-1,3,5-triazine, V: condensation product of N,N'-bis(2,2,6,6-tetramethyl-4-piperidyl)hexamethylenediamine and 4morpholino-2,6-dichloro-1,3,5-triazine, or VI: condensation product of 2,4-dichloro-6-(4-n-butylamino-2,2,6,6-tetramethylpiperidyl)-1,3,5-triazine and 1,2-bis{3-[4',6'-di(4"-n-butyl-amino-2",2",6",6"-tetramethylpiperidyl)-1',3',5', triazinyl] aminopropylamino}ethane.

4. The method as claimed in claim 2, wherein the proportion of said amine of formula I, II, or III, based on the total weight of sterically hindered amine, is from 0.1 to 99.9% by weight.

5. The method as claimed in claim 2, wherein the content of sterically hindered amine based on the weight of the plastic is from 0.001 to 5% by weight.

6. The method as claimed in claim 2, wherein said plastic is a homo- or copolymer of a mono- or diolefin or a mono-and a diolefin or a mixture of said homo- or copolymers.

7. The method as claimed in claim 6, wherein said plastic is a said mixture.

8. The method as claimed in claim 6, wherein said plastic is a copolymer, and a said mono-olefin is a vinyl monomer.

9. The method as claimed in claim 2, which contains, in addition to said sterically hindered amine, an effective amount of at least one further stabilizing or protective or nucleating additive, or an additive for modifying the handling, color, or processing of said plastic.

10. The method as claimed in claim 7, wherein said stabilizing or protective or nucleating additive or additive for modifying the handling, color, or processing of said plastic is an antioxidant, an antidew agent, an antistatic agent, a flame inhibitor, a filler, a light stabilizer, a metal deactivator, a nucleating agent, a pigment, an acid scavenger, a processing stabilizer, or a mixture of said additives.

11. The method as claimed in claim 2, wherein the proportion of said amine of formula I, II, or III, based on the total weight of sterically hindered amine, is from 1 to 99% by weight.

12. The method as claimed in claim 3, wherein the proportion of said amine of formula I, II, III, IV, V, or VI, based on the total weight of sterically hindered amine, is from 0.1 to 99.9% by weight.

13. The method as claimed in claim 3, wherein the content of sterically hindered amine based on the weight of the plastic is from 0.02 to 1% by weight.

14. A method for inhibiting the sulfur uptake of an organic, polymeric plastic, comprising the step of:

adding to said plastic at least one of the following sterically hindered amine compounds:

I: oligomerized 2,2,4,4-tetramethyl-20-(oxiranylmethyl)-7-oxa-3,20-diazadispiro[5.1.11.2]heneicosan-21-one, II: condensation product of 2-chloro-4,6-di(4-n-butylamino-1,2,2,6,6-pentamethylpiperidyl)-1,3,5-triazine and 1,2-bis(3-aminopropylamino)ethane, or III: condensation product of 1-hydroxyethyl-2,2,6,6-tetramethyl-4-hydroxypiperidine and succinic acid.

* * * * *